United States Patent [19]

Tomikawa

[11] 4,183,427
[45] Jan. 15, 1980

[54] CONVEYOR LOAD TRANSFER APPARATUS

[75] Inventor: Hisao Tomikawa, Tokorozawa, Japan

[73] Assignee: Tsubakimoto Chain Co., Osaka, Japan

[21] Appl. No.: 914,794

[22] Filed: Jun. 12, 1978

[30] Foreign Application Priority Data

Jun. 22, 1977 [JP] Japan ................................ 52-73329

[51] Int. Cl.² ...................... B65G 47/36; B65G 47/61
[52] U.S. Cl. .................................. 198/464; 198/486; 414/752
[58] Field of Search ............... 198/341, 464, 469, 486; 214/1 BB, 1 BT

[56] References Cited

U.S. PATENT DOCUMENTS

| | | | |
|---|---|---|---|
| 2,525,572 | 10/1950 | Woody et al. | 214/1 BB X |
| 3,283,918 | 11/1966 | Devol | 198/341 X |
| 3,884,363 | 5/1975 | Ajlouny | 214/1 BB |
| 4,005,782 | 2/1977 | Crockett | 214/1 BB |

*Primary Examiner*—Jeffrey V. Nase
*Attorney, Agent, or Firm*—Blanchard, Flynn, Thiel, Boutell & Tanis

[57] ABSTRACT

Conveyor load transfer apparatus, including a follow-up carriage movable in the direction in which a conveyor moves and driven by a double-acting cylinder. A transverse carriage is supported on the follow-up carriage and is movable perpendicular to the running direction of the conveyor, being driven back and forth by a transverse motor mounted on the follow-up carriage. An article-handling segment, driven up and down by an elevation drive source, is mounted on the transverse carriage. A follow-up detector is mounted on the follow-up carriage to generate deviation signals representing relative positions of the follow-up carriage and an article-supporting device of the conveyor. A double-acting cylinder expands and contracts according to the motion of the follow-up carriage, and is connected to a pressure-compensating solenoid flow-rate regulating valve with a check valve connected between the two ports thereof. The elevation drive source includes two individually controlled double-acting air cylinders arranged in series, one air cylinder having a buffering device including a check valve connected between the two ports thereof and a throttle valve, with a check valve, connected to the rod-side port thereof.

2 Claims, 33 Drawing Figures

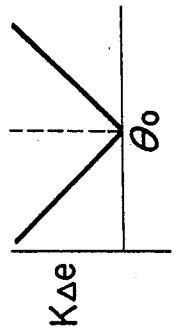
FIG.17(a)
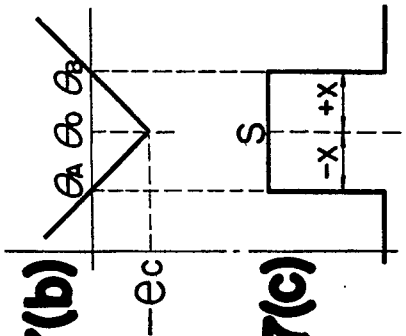
FIG.17(b)
FIG.17(c)
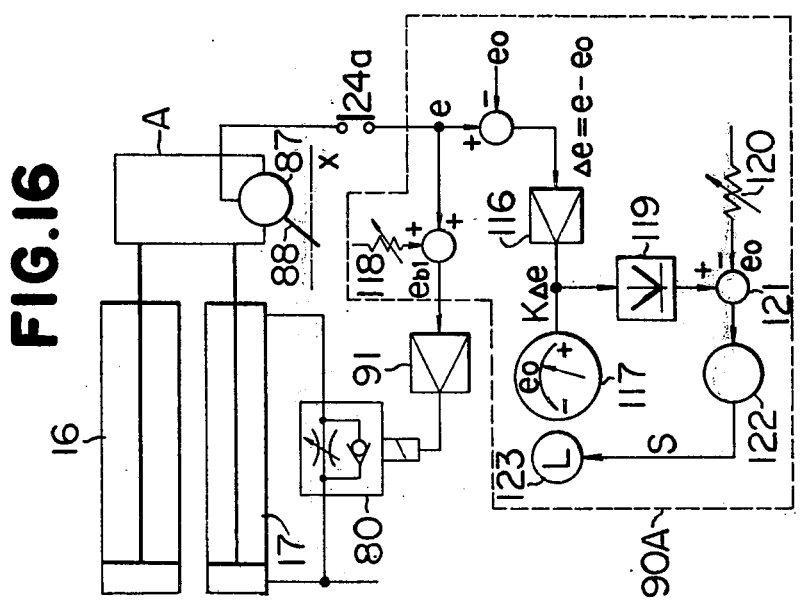
FIG.16

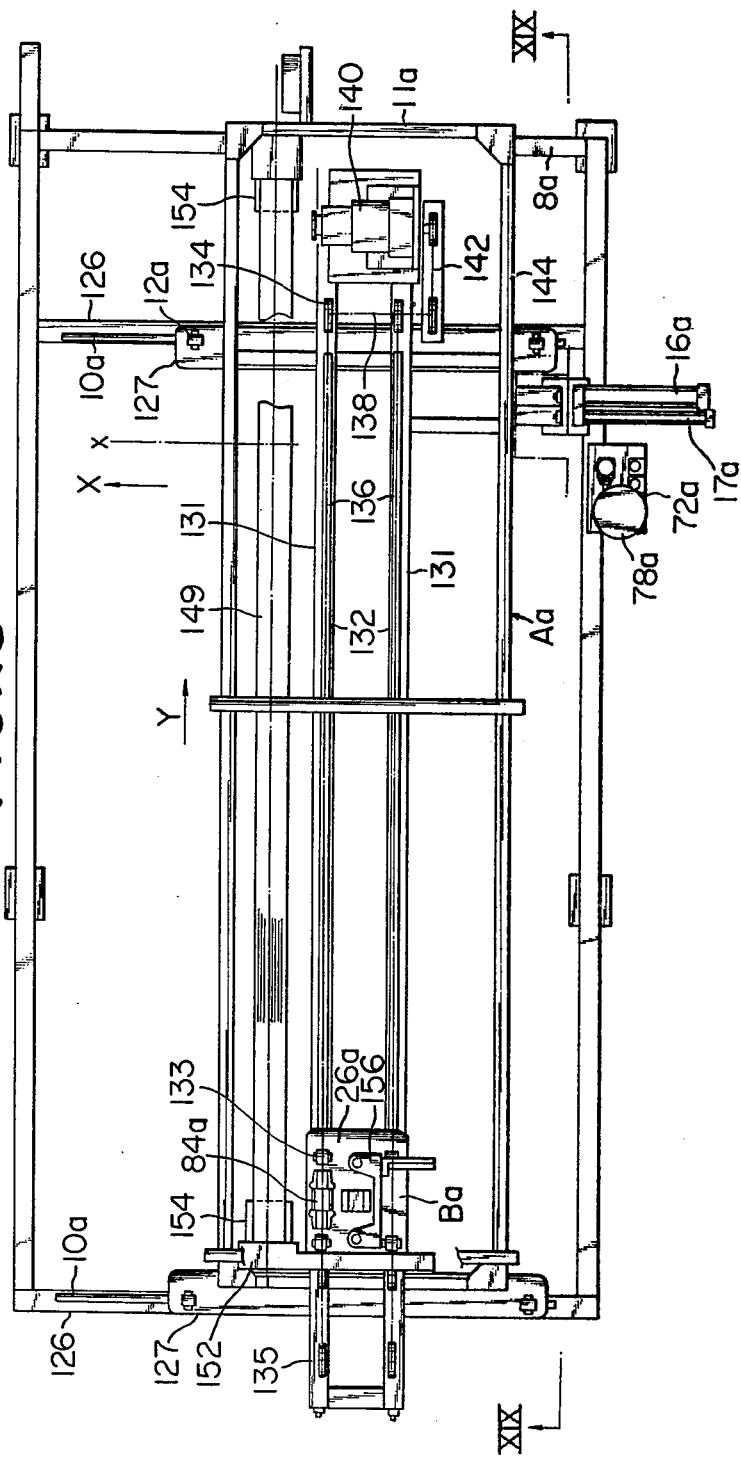

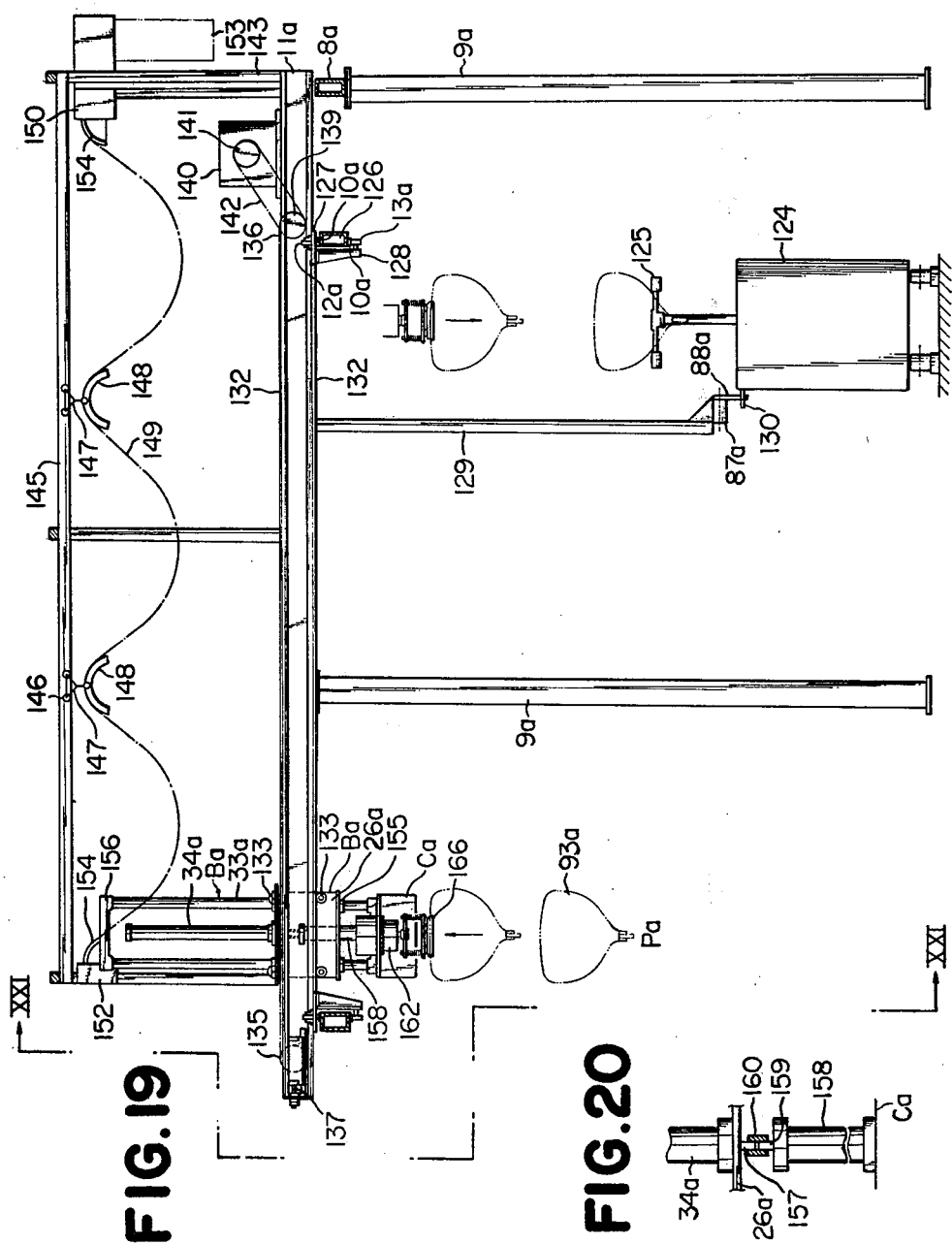

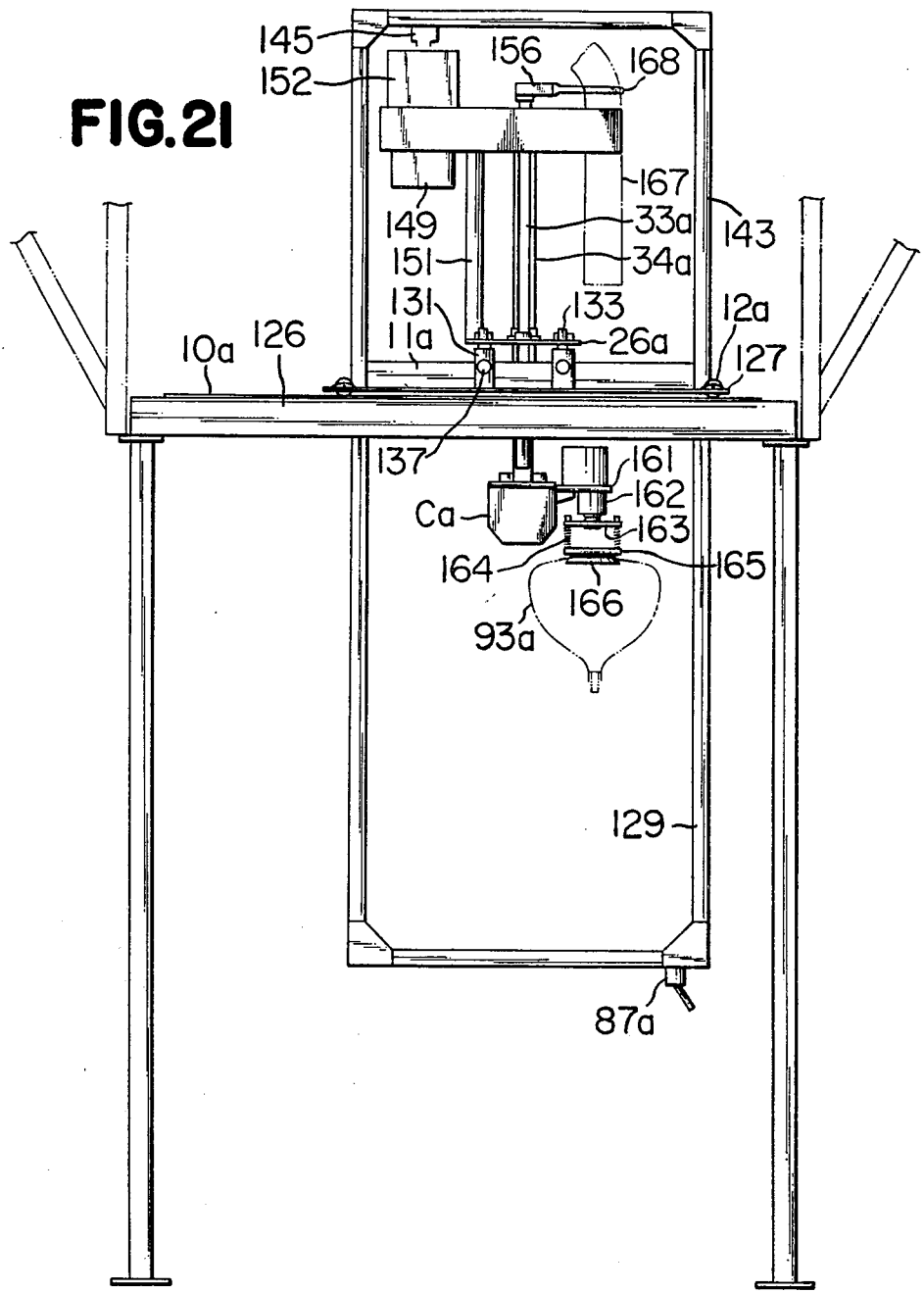

4,183,427

CONVEYOR LOAD TRANSFER APPARATUS

FIELD OF THE INVENTION

This invention relates to a conveyor load transfer apparatus that automatically transfers an article onto or off a hanger of an intermittent conveying device, such as a trolley conveyor, in operation, or automatically transfers an article from one intermittent conveying device to another.

BACKGROUND OF THE INVENTION

Conventionally, this type of transfer operation has been done largely manually. Automatic transfer apparatus for loading a simple-shaped article onto a hanger of such conveying device has been proposed. This apparatus comprises an arm that holds an article and projects into a passage through which hangers of a conveyor travel, whereby the article timely dropped from the arm is received by a hanger coming thereunder. Such known automatic transfer apparatus, however, is low in operating accuracy, unusable for articles of complex shape, and involves risks in the transfer of such fragile articles as TV Braun tubes.

Also, several apparatus to transfer an article onto a hanger while following a moving conveyor have been proposed. Some employ an auxiliary conveyor or hydraulic system as the follow-up device. Another example comprises an article supporting carriage that is mechanically engaged with a hanger so that the carriage is caused to follow a moving conveyor by the tractive force of the conveyor. However, the former is complex in construction and not easy to maintain. The latter moves with all hangers. Therefore, when the hangers carry articles of different kinds to be distributed in several places, the transfer apparatus will follow even such hangers as carry the articles not desired. This extra motion often shortens the apparatus life or impedes the interlocking with peripheral equipment.

There is also known apparatus for automatically transferring an article carried by a hanger of a trolley conveyor to another intermittent conveyor. This apparatus brings the article conveying cycle of the trolley conveyor into agreement with that of the intermittent conveyor, and operates the transfer apparatus itself in a shorter cycle than theirs. This transfer apparatus requires a complex control device, which is likely to become more complicated to permit the re-transfer of the article from the intermittent conveyor to still another conveyor.

An object of this invention is to provide transfer apparatus that is capable of transferring articles, even of complex shape, onto and off such intermittent conveying devices as trolley conveyor.

Another object of this invention is to provide transfer apparatus that performs such cyclic motion as is suitable for the transfer of articles between one intermittent conveying device and another.

Now some embodiments of this invention will be described by reference to the accompanying drawings.

BRIEF DESCRIPTION OF THE DRAWINGS

FIG. 16 is a hydraulic control circuit diagram similar to FIG. 13, but showing another embodiment of a synchronizing corrector-regulator.

FIGS. 17(a) and (b) show the input-output characteristics of an absolute-value circuit and the comparator of FIG. 16, respectively.

FIG. 18 is a plan view of another embodiment of the transfer apparatus according to this invention.

FIG. 19 is a cross-sectional front view taken along the line XIX—XIX of FIG. 18.

FIG. 20 is a partial front view of the elevating cylinder in FIG. 19.

FIG. 21 is a side elevational view taken along line X—X of FIG. 19.

DETAILED DESCRIPTION

Figure 1:
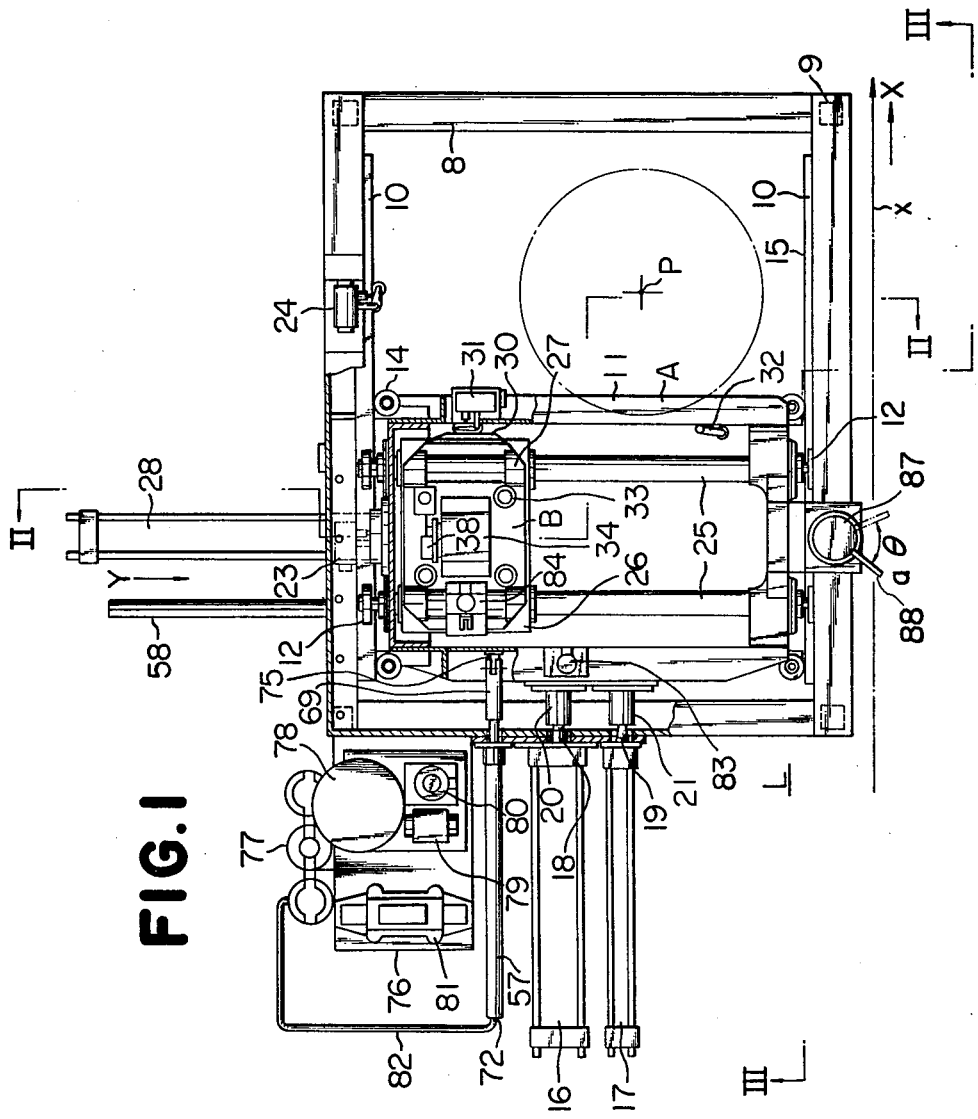
FIG. 1 is a plan view of an embodiment of this invention, with a part thereof cut away.
Figure 2:
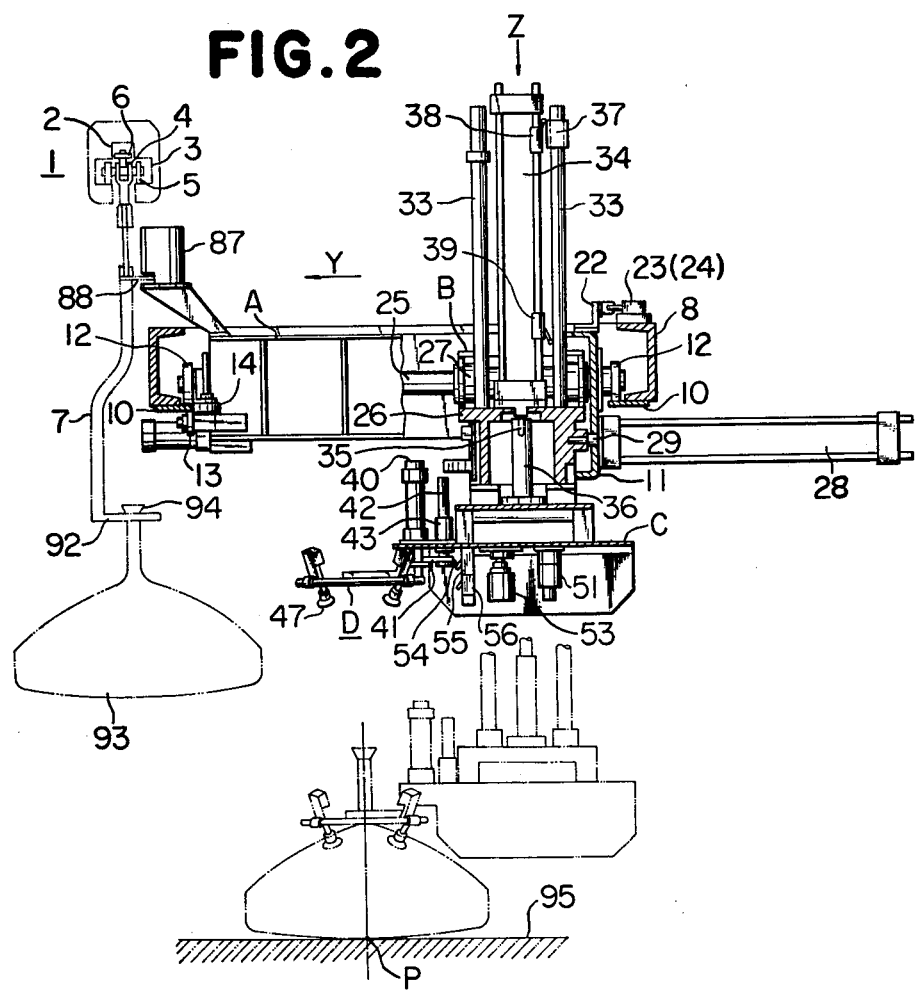
FIG. 2 is a cross-sectional side elevation taken along line II—II of FIG. 1.
Figure 3:
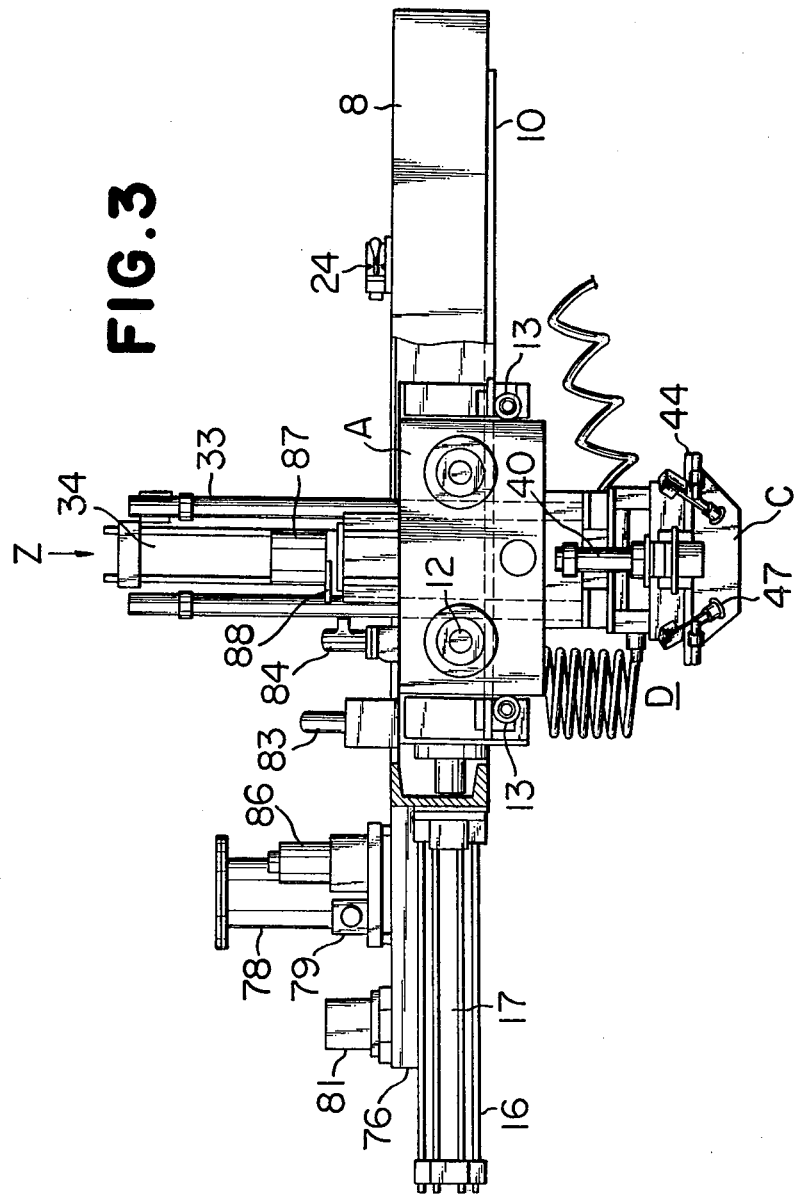
FIG. 3 is a cross-sectional front view taken along line III—III of FIG. 1.

In FIGS. 1 through 3, a trolley conveyor 1 (FIG. 2) comprises a rail 2 fixed to a ceiling etc. and a trolley 4 adapted to move through a longitudinal, bottom-open hollow 3 in the rail 2. The trolley 4, whose position is controlled vertically and horizontally by rollers 5 and 6, carries a hanger 7 or other article-supporting device attached thereto in the direction of the arrow (FIG. 1)

along a vertical conveying plane x extending in the direction of the X axis.

Conveyor load transfer apparatus L is provided in the vicinity of the conveying plane x. A fixing frame 8, shown with a part thereof cut open, is made up of steel channels fabricated into a rectangular form by welding or other method, and fixed to the floor by braces 9. A pair of rails 10, extending in the direction of the X axis, are fixed to the bottom of the frame 8 on the two parallel sides thereof. A follow-up carriage A is horizontally guided and moved, in the direction of the X axis, over the frame 8 by two pairs each of running rollers 12 and float-preventing rollers 13, which rollers are supported by the carriage frame 11 and contact the top and bottom surfaces of the rails 10 respectively, and two pairs of guide rollers 14 that have vertical shafts supported by the frame 8 and which contact the internal surface 15 of the rails 10.

On the upstream side of the travelling conveyor 1, one end each of a double-acting air cylinder 16 and a double-acting hydraulic cylinder 17, both extending in the direction of the X axis, is attached to one side of the frame 8. Piston rods 18 and 19 of said two cylinders are passed through holes made in the frame 8, and the ends of said rods are connected with metal connectors 20 and 21 projecting from the carriage frame 11. The air cylinder 16 reciprocates the follow-up carriage A. The hydraulic cylinder 17 controls the speed of the follow-up carriage A, as described later. The position of the moving end of the follow-up carriage A is detected by limit switches 23 and 24 on the frame 8 that are operated by a dog 22 on the frame 11.

The follow-up carriage A has a pair of horizontally extending guide bars 25 disposed perpendicular to the X axis or in the direction of the Y axis. Said guide bars 25 are passed through a guide block 27 fixed to a frame 26 of a transverse carriage B, thereby supporting the transverse carriage B so as to be slidable in the direction of Y axis. A piston rod 29 of a double-acting air cylinder 28, whose one end is attached to the carriage frame 11, is fixed to the frame 26. The cylinder 28 reciprocates the transverse carriage B in the direction of the Y axis. The position of the traversing end of the transverse carriage B is detected by limit switches 31 and 32 on the frame 11 of the follow-up carriage A that are operated by a dog 30 on the transverse carriage B.

An elevating frame C (FIG. 2) is elevatably guided and supported by the transverse carriage B, with four vertical (extending in the direction of the Z axis) guide rods 33 fixed thereto being slidably inserted in guide bushes fixed to the frame 26 of the transverse carriage B. A piston rod 35 of an elevating air cylinder 34 mounted on the frame 26 is connected with a rod-like metal segment 36 fixed to the elevating frame C, so that the elevating frame C is moved up and down by said cylinder 34. The end positions of the elevating frame are detected by limit switches 38 and 39 on the air cylinder 34 that are operated by a dog 37 on the guide rod 33.

A support plate 41 of an article-handling segment D is attached to a piston rod of a double-acting air cylinder 40, which cylinder is mounted on the elevating frame C. A vertical guide bar 42 fixed to the support plate 41 is slidably passed through a guide pipe 43 fixed to the elevating frame C. The air cylinder 40 guidingly moves the handling segment D up and down.

Figure 4:
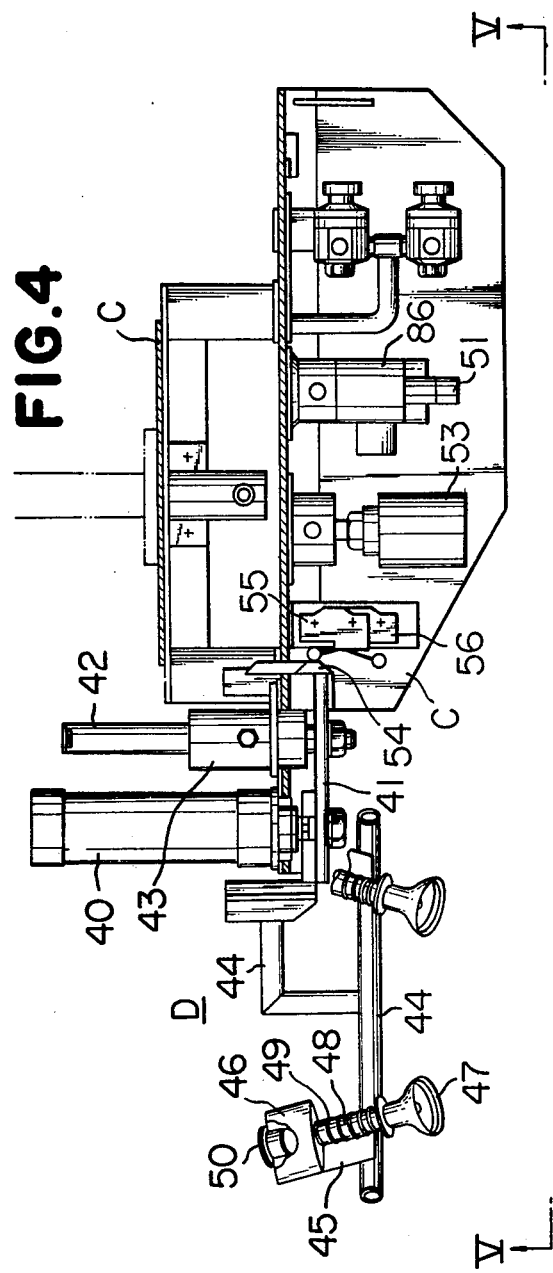
FIG. 4 is an enlarged front view of an elevating frame and a handling segment in FIG. 3, with a part thereof cut away.
Figures 5, 6:
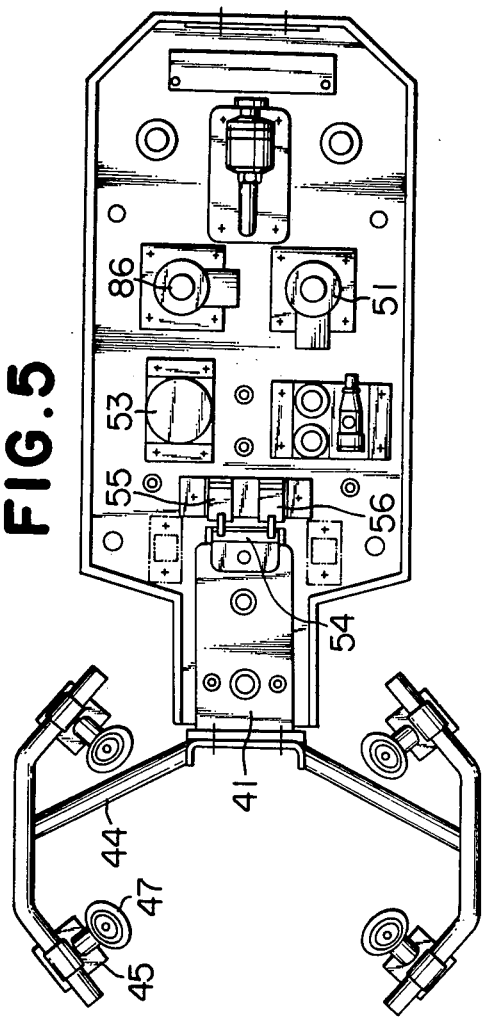
FIG. 5 is a bottom view taken along line V—V of FIG. 4.
FIG. 6 is a longitudinal cross-sectional view of an ejector.
Figure 8:
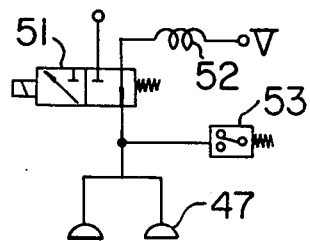
FIG. 8 is a vacuum control circuit diagram of the same embodiment.

FIGS. 4 and 5 illustrate details of the handling segment D. Four couplers 45 are fixed to a support bar 44 fixed to the support plate 41, symmetrically with respect to the X and Y axes and at a suitable incline with respect to the Z axis. A pipe 48 having a vacuum cup 47 at the lower end thereof is inserted in a bearing portion 46 of the coupler 45. A buffering coil spring 49 is provided over the pipe 48, between the vacuum cup 47 and the bearing portion 46, to hold the pipe 48 in such position that a stop 50 fixed to the upper end thereof contacts the top surface of the bearing portion 46. This holding mechanism permits the vacuum cups 47 to be pressed against an article to be sucked, without breaking the article. The vacuum cups 47 connect with a solenoid change-over valve 51, and through a hose 52 (FIG. 8) with a vacuum source V (not shown). Whether or not the vacuum cups 47 are sucking the article is detected by a vacuum switch 53.

The position of the elevating end of the handling segment D with respect to the elevating frame C is detected by limit switches 55 and 56 on the elevating frame C that are operated by a dog 54 on the support plate 41.

Ejectors 57 and 58 (FIG. 1) are provided to the frames 8 and 11, respectively, to supply compressed air to the air cylinders 28 and 34 respectively attached to the follow-up carriage A and the transverse carriage B.

The ejectors 57 and 58 are of the same construction, as cross-sectionally shown in FIG. 6. A sleeve 61 and a connection pipe 62 are airtightly press-fitted in external pipes 59 and 60, respectively, that are airtightly and concentrically screwed together. A slide pipe 63 is fitted in the sleeve 61, with a sliding surface thereof being sealed by an O-ring 64. A felt dust seal 67 is fitted in an indentation 66 formed in the end of a flange 65 of the external pipe 59, and fixed by pushing in a retainer ring 68. A closed-end connection pipe 69 is airtightly put on the other end of the slide pipe 63. Tapered, screwed connection ports 70 and 71 are formed in the connection pipe 69 and the slide pipe 63. A tapered, screwed fitting 72 is fixed to the other end of the connection pipe 62.

The external pipe 59 of ejector 57 is fixed to that side of the frame 8 to which the air cylinder 16 is fixed, by bolts passed through holes 73 in the flange 65. The connection pipe 69 is passed through a hole in the frame 8, and connected with a metal coupler 75 projecting from the frame 11 of the follow-up carriage A by passing a pin through a hole 74 made in the end thereof. The ejector 58 is similarly mounted on the frame 11.

Figure 7:
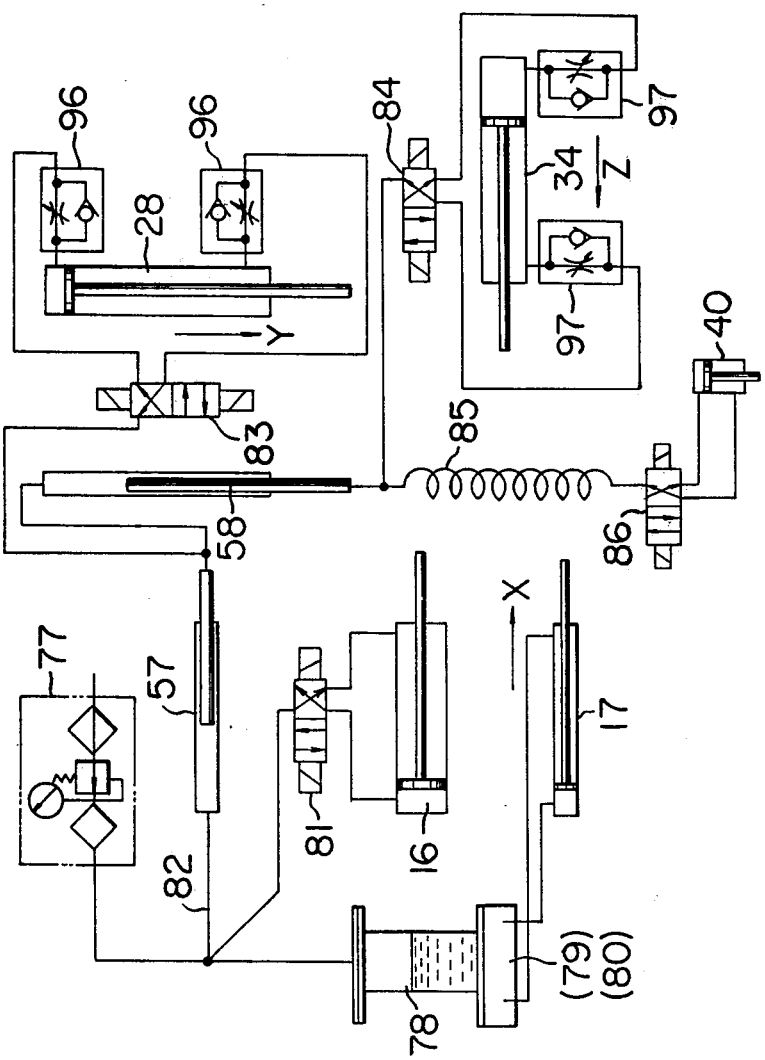
FIG. 7 is an air-pressure and hydraulic control circuit diagram of the embodiment shown in FIG. 1.

Next, the compressed air and hydraulic circuits will be described by reference to FIG. 7.

The circuit includes a compressed-air supply device 77 containing a regulator, filter and oiler, an oil tank 78, a throttle valve 79 and a pressure-compensating solenoid flow-rate regulating valve 80, each of said two valves having a check valve and leading to the hydraulic cylinder 17, and a solenoid change-over valve 81 for the air cylinder 16 which is fitted to a bracket 76 (FIG. 3) fixed to the fixed frame 8. The screwed fitting 72 of the ejector 57 is connected with the compressed-air supply device 77 through a hose 82. The screwed connection ports 70 and 71 are connected with an operating change-over valve 83 of the air cylinder 28 on the frame 11 and the screwed fitting of the ejector 58, respectively, through hoses (not shown). One of the screwed connection ports of the ejector 58 connects with an operating change-over valve 84 of the air cylinder 34 on the transverse carriage B, and the other port with an operating solenoid change-over valve 86 of the air cylinder 40 through a hose 85.

A follow-up detector 87 (FIGS. 1-3) is fitted to the frame 11 of the follow-up carriage A so as to face the conveying plane x. The follow-up detector 87 has a rotating arm 88 that projects into the conveying plane x and is normally pulled by a spring to stop in a position a inclined toward the direction from which the hanger 7 comes.

When the arm 88 is turned by the hanger 7 that engages therewith, a rotating potentiometer, concentrically disposed with a vertical rotating shaft of the arm 88, generates a deviation signal e proportional to an angle of rotation $\theta$ of the arm 88. When the angle of rotation becomes $\theta$o (reference angle), or the follow-up carriage A runs at the same speed with the hanger 7, a magnet (not shown) fitted to said vertical rotating shaft actuates a lead switch (not shown) to generate a synchronizing signal.

Figure 9:
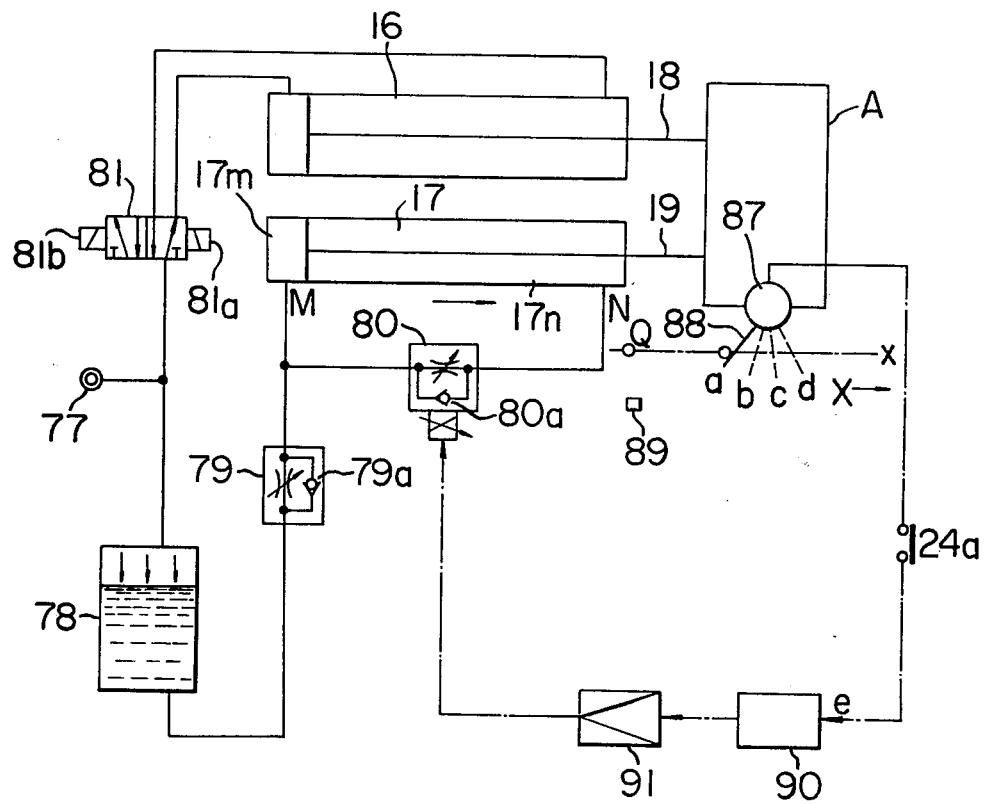
FIG. 9 is a follow-up control circuit diagram of the same embodiment.

FIG. 9 exemplifies a control circuit to cause the follow-up carriage A to pursue the hanger 7. Given that the follow-up carriage A is in the waiting position at the left end of FIG. 1. When the hanger 7 carrying an article reaches point Q (FIG. 9), an approach switch 89 detects the article and generates a signal that energizes a solenoid 81a of the change-over valve 81 to switch said valve to the illustrated position. Thereupon the compressed-air supply device 77 feeds air to the head side of the air cylinder 16, thus pushing the follow-up carriage A rightwardly. This pushing force works on the rod 19 of the hydraulic cylinder 17 to discharge pressurized oil from cylinder chamber 17n.

The flow-rate regulating valve 80 is connected between ports M and N of the hydraulic cylinder 17, and the port M, in turn, connects with a pressurized-side port of the oil tank 78 through the throttle valve 79. Said deviation signal e generated by the follow-up detector 87 is inputted into the solenoid of the flow-rate regulating valve 80 via a contact 24a of the limit switch 24, a synchronizing corrector-regulator 90 and an amplifier 91, to open the flow-rate regulating valve 80 in proportion to the deviation signal e. When the arm 88 lies in position a, the deviation signal e is zero, the flow-rate regulating valve 80 is closed, and the outflow of pressurized oil from the chamber 17n is prevented by the check valve 80a. Accordingly, the hydraulic cylinder 17 is locked, and the follow-up carriage A remains at a standstill even if compressed air is supplied to the air cylinder 16. The contact 24a is closed by an actuating signal from the approach switch 89.

When the hanger 7 engages with and turns the arm 88, the deviation signal e is generated, which opens the flow-rate regulating valve 80 and permits the inflow of pressurized oil from the chamber 17n to the chamber 17m. Consequently, the rod 19 moves outwardly in the direction indicated by the arrow, at a speed proportional to the opening of the flow-rate regulating valve 80, and the follow-up carriage A is moved rightwardly. At this time, the chamber 17m can admit more oil than that discharged from the chamber 17n. The difference is proportional to the cross-sectional area of the rod 19, and is made up for from the oil tank 78 through a check valve 79a in the throttle valve 79. Under the influence of the pressurized air supplied from the compressed-air supply device 77, the oil tank 78 accelerates the inflow of pressurized oil into the chamber 17m and stabilizes the operating speed of the hydraulic cylinder 17.

As described above, the speed of the follow-up carriage A is controlled by the opening of the flow-rate regulating valve 80. Therefore, the follow-up carriage A moves side-by-side with the hanger 7 if the flow-rate regulating valve 80 is so adjusted that the follow-up carriage A runs at the same speed with the hanger 7 when the arm 88 lies in the reference position c. When the follow-up carriage A runs slower than the hanger 7, the arm 88 turns from position c to d, whereupon the deviation signal e becomes magnified to enlarge the opening of the flow-rate regulating valve 80. Thence, the rod 19 of hydraulic cylinder 17 projects at a greater speed, thus increasing the speed of the follow-up carriage A. When, conversely, the follow-up carriage A runs faster than the hanger 7, the arm 88 moves from position c to b to decrease the speed of the follow-up carriage A.

As will be evident from the above, the speed of the follow-up carriage A is automatically controlled, depending upon the amount of deviation of the arm 88 from the reference position, which deviation is converted into a feedback signal. Therefore, the follow-up carriage can accurately pursue the conveyor 1, within the range of the follow-up ability of the flow-rate regulating valve 80, even if the speed of the conveyor 1 changes. The synchronizing corrector-regulator 90 compensates for changes in said reference position according to the speed variations of the conveyor 1, as will be described later.

While the follow-up carriage A is moving side-by-side with the hanger 7, the follow-up carriage A and the hanger 7 are in such relative positions as to maintain the arm 88 in position c. At this time, said synchronizing signal generated by the follow-up detector 87 causes an article to be transferred over to the hanger 7, as described later. Then, as the follow-up carriage A actuates the limit switch 24, the contact 24a thereof opens to intercept said deviation signal. Thereupon the flow-rate regulating valve 80 closes and the follow-up carriage A stops.

The follow-up carriage A can be moved to the left in FIG. 1 by shifting the change-over valve 81 to a position opposite to that illustrated in FIG. 9 by energizing a solenoid 81b thereof. Then, the air cylinder 16 generates a pulling force to draw in the hydraulic cylinder 17 via the follow-up carriage A, as the head side thereof communicates with the atmosphere and the rod side receives compressed air. Therefore, part of pressurized oil in the chamber 17m flows into the chamber 17n through the check valve 80a in the flow-rate regulating valve 80, and the remainder into the oil tank 78 through the throttle valve 79. Accordingly, the return speed of the follow-up carriage A depends on the opening of the throttle valve 79.

When the follow-up carriage A returns to the original waiting position, the piston of the air cylinder 16 touches the internal end of the cylinder and the follow-up carriage A stops. Even after this stoppage, the change-over valve 81 does not switch and remain as shown in FIG. 7.

Now the following paragraphs describe the operation to transfer the article onto and off the hanger 7. The description will be limited to the take-off operation, because the loading operation is performed in reverse order.

The hanger 7, carrying a TV Braun tube 93, has a two-prong fork 92 horizontally fixed to the lower end thereof for holding the neck electrode portion 94. The hanger moves in the direction of the X axis, and places the Braun tube 93 off the hanger 7 onto point P on a transfer table 95. Initially, the follow-up carriage A and the transverse carriage B are in their waiting positions illustrated in FIG. 1, while the elevating frame C and the handling segment D are in the elevated positions shown in FIGS. 2 and 3. These waiting and elevated positions are confirmed by the operation of the limit switches 23, 31, 37 and 55. The change-over valves 81, 83, 84 and 86 are in positions shown in FIG. 7, while the change-over valve 51 in a position opposite to that shown in FIG. 8.

(1) When the hanger 7 holding the Braun tube 93 reaches point Q, the approach switch 89 switches the change-over valve 81 by detecting the Braun tube 93.

(2) When the hanger 7 approaches further to turn the arm 88, the follow-up carriage A starts to move side-by-side with the hanger 7 as described previously.

(3) In this state, the follow-up detector generates a synchronizing signal that switches the change-over valve 83, whereby the air cylinder 28 projects and the transverse carriage B advances (downwardly in FIG. 1).

(4) When the advancing end actuates the limit switch 32, the transverse carriage B stops, whereupon the center of the four vacuum cups 47 coincides with that of the Braun tube 93 held by the hanger 7. An operating signal of the limit switch 32 switches the change-over valve 51 (FIG. 8) to the illustrated position, whereby the vacuum cups 47 become ready to suck and the change-over valve 86 switches to project the rod of air cylinder 40 downwardly. When the vacuum cups 47 have lowered enough to contact the Braun tube 93, the limit switch 56 operates to stop the descent thereof, and the vacuum cups 47 suck against the Braun tube 93.

(5) On completion of the suction, the vacuum switch 53 operates to generate a detection signal that switches the change-over valve 86 again, whereby the rod of air cylinder 40 withdraws and the vacuum cups 47 lift the Braun tube 93 off the hanger 7.

(6) When the air cylinder 40 reaches its upper limit, the limit switch 55 operates to generate a signal that switches the change-over valve 83 again, whereby the air cylinder 28 withdraws and the transverse carriage B retreats. Retreating to the extremest end, the transverse carriage B stops, and the limit switch 31 operates. The follow-up carriage A stops when it reaches the right end, and the limit switch 24 operates. At this time, the Braun tube 93 is above the unloading point P.

(7) Operating signals of the limit switches 24 and 31 switch the change-over valve 84, thus projecting the rod of air cylinder 34 and lowering the elevating frame C.

(8) When the elevating frame C reaches the lowest limit, the limit switch 39 operates to generate a signal to switch the change-over valve 51 to a position opposite to that illustrated, whereby the vacuum cups 47 are supplied with positive pressure to release the Braun tube 93.

(9) The positive pressure switches the vacuum switch 53. A signal generated thereby switches the change-over valves 81, 84 and 86 to return the air cylinders 16, 34 and 40 to their waiting or elevated positions.

During the above-described operation, the projecting and withdrawing speeds of the air cylinders 28 and 34 can be moderated by throttle valves 96 and 97 (FIG. 7), each having a check valve, provided in their air supply-discharge pipes.

The foregoing completes a cycle of the operation. The operating time may be shortened by moving the carriages A and B simultaneously, or by raising the transfer table 95 to eliminate the operation of the air cylinder 34. The above-described sequential operations, performed by the limit switches, may also be achieved by use of a timer. Also, the handling segment D may employ grasping means, electromagnets, or other suitable means depending on the type of article conveyed, in place of the vacuum cups.

As understood from the above, the apparatus of this invention follows the hanger by electrically detecting the relative position of the handling segment with respect thereto. This permits changing the relative position at will. Accordingly, an article can be transferred at the best suited relative position, depending on the shape and kind of the article. Furthermore, the apparatus can be selectively operated by providing an approach switch at point Q that distinguishes one article from another, thus permitting the sorting of the articles. Achieved by the engagement of the follow-up detector arm with the hanger, detection of the relative position is not limited by the type of the conveyor, the shape of the hanger, and other conditions. The follow-up carriage is driven by the air cylinder, with the follow-up speed thereof controlled by a combination of the hydraulic cylinder and the pressure-compensating solenoid flow-rate regulating valve. Therefore, the carriage speed does not change with the variations in air pressure and load. This assures a high follow-up accuracy, so that even complicatedly shaped or fragile articles can be transferred onto and off the hanger.

Figure 10:
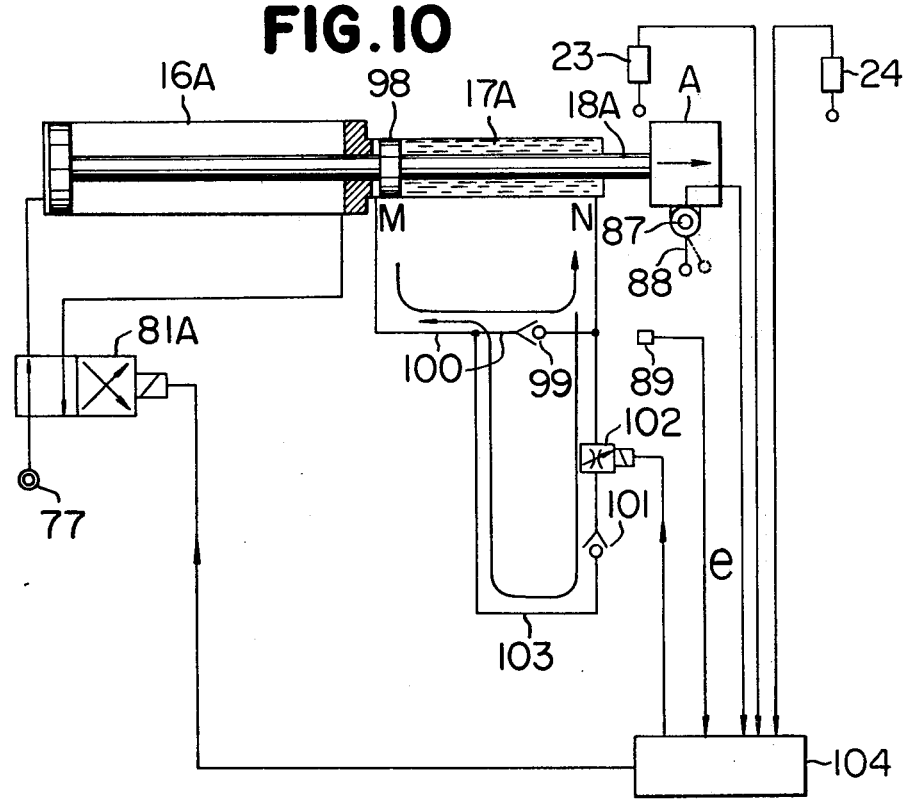
FIG. 10 is a follow-up control circuit diagram in which an air cylinder and a hydraulic cylinder are connected in series.

FIG. 10 shows another embodiment wherein an air cylinder 16A and a hydraulic cylinder 17A are connected in series so that a rod 18 common to both cylinders connects with the follow-up carriage A to control the follow-up operation thereof, in place of the air cylinder 16 and the hydraulic cylinder 17 arranged in parallel in FIG. 9.

The hydraulic cylinder 17A in this embodiment is of double-rod type, so the total quantity of pressurized oil therein remains constant even when the piston 98 moves. This dispenses with the oil tank 78 shown in FIG. 9. Between the ports M and N are connected, in parallel, a pipe line 100 having a check valve 99 to permit a flow from port M to port N and a pipe line 103 having a check valve 101 permitting the opposite flow and a solenoid flow-rate regulating valve 102.

Controlled by the solenoid change-over valve 81A, the air cylinder 16A reciprocates the follow-up carriage A. The hydraulic cylinder 17A controls the speed of the follow-up carriage A, running in the direction of the arrow, according to the opening of the flow-rate regulating valve 102. Inputted with the deviation signal e, proportional to the difference between the relative positions of the follow-up carriage A and the hanger 7, generated by the follow-up detector 87, the detection signal from the approach switch 89, and the operating signals from the limit switches 23, 24 and so on, a controller 104 performs the same follow-up and sequential controls on the follow-up carriage A as with the embodiment shown in FIG. 9. The advantage of this embodiment is its simplified hydraulic circuit.

Figure 11:
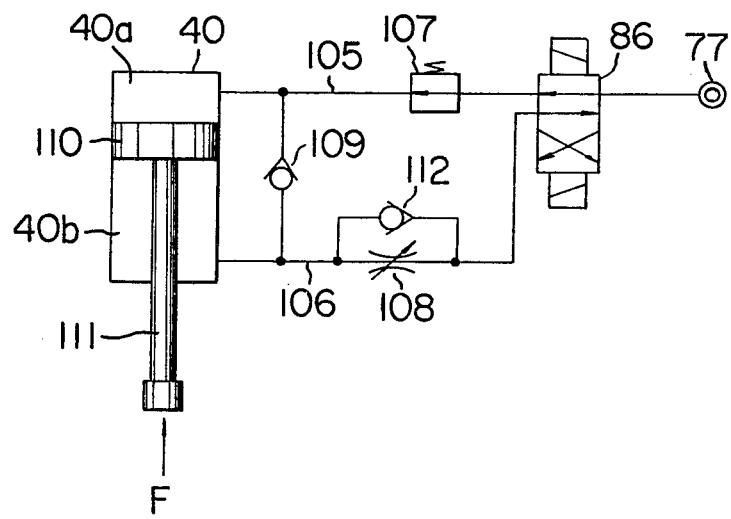
FIG. 11 is a control circuit diagram wherein the operating characteristic of an air cylinder for elevating the handling segment is improved.

As shown in FIG. 4, the vacuum cups 47 are provided with springs 49 to relieve the shock that is given to the article on being engaged. The air cylinder 40 itself may be so designed as to perform such shock-relieving function. FIG. 11 exemplifies an operating circuit for such air cylinder. A reducing valve 107 having a relief section and a throttle valve 108 having a check valve 112 are connected to pipe lines 105 and 106, respectively, that connect the air cylinder 40 with the solenoid change-over valve 86, with a check valve 109 connected between said pipe lines 105 and 106.

On switching the change-over valve 86 to the position illustrated, the reducing valve 107 reduces the compressed air supplied from the compressed-air supply device 77 to a given pressure level. Part of the reduced air directly enters the cylinder chamber 40a, and the remainder enters the cylinder chamber 40b through the check valve 109. The pressure-receiving area of a piston 110 is larger in the chamber 40a than in the chamber 40b, by the cross-sectional area of the rod 111. Therefore, the piston 110 descends, with the descending speed thereof being adjusted in accordance with the opening of the throttle valve 108. When a reaction force F acts on the rod 111 in this state, air in the pipe line 105, singularly or in conjunction with air in the chamber 40a depending on the magnitude of the reaction force, flows through the check valve 109 into the pipe line 106, thence to the outside through the throttle valve 108. Consequently, the pressure in the chambers, 40a and 40b drops to a level equal to the pressure on the entry side of the throttle valve 108, so that the rod 111 slows down, stops or rises, depending on the magnitude of the reaction force F, as if it incorporates a spring.

On switching the change-over valve 86 to a position opposite to that shown in FIG. 11, compressed air enters the chamber 40b, via the check valve 112, to raise the rod 111. At the same time, air in the chamber 40a is discharged outside from the relief section of the reducing valve 107.

According to this embodiment, the vacuum cups 47 descend at a speed suitably adjusted as described before, and a contact pressure arises when the descending vacuum cups touch an article to be sucked. The contact pressure acts through the vacuum cups 47 on the rod 111 as a reaction force to decelerate the rod 111. Consequently, the vacuum cups 47 stop when the contact pressure, increasing little by little, reaches a given level, without imparting any undesirable shock on the article.

As in the case of the previously described embodiments, the article transfer operation of this embodiment also is started by a synchronizing signal generated when the relative-positional difference between the hanger 7 of the moving conveyor 1 and the follow-up carriage A comes within a given range. This range can be adjusted by adjusting a pair of lead switches (not shown) in the follow-up detector 87 in accordance with the size and shape of the article and other conditions. When the conveyor speed changes, and the position of the arm 88 of the pursuing follow-up detector 87, i.e., the reference position, changes, the relative-positional difference gets out of the given range, and the article becomes untransferable.

Figure 12:
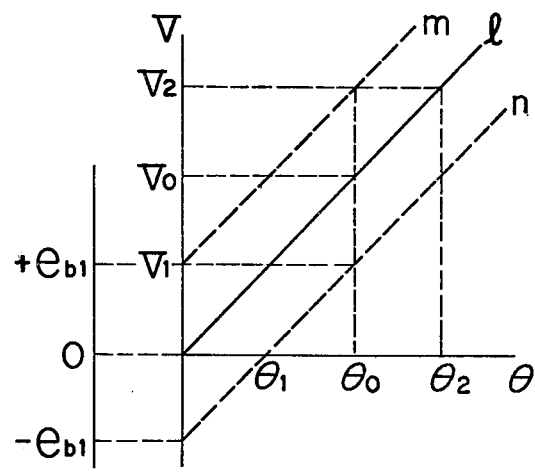
FIG. 12 is a follow-up characteristic diagram showing the relationship between the angle of rotation of an arm of a follow-up detector in the pursuing condition and the conveyor speed.

FIG. 12 shows the relation characteristic between the conveyor speed V and the angle of rotation $\theta$ of the arm 88 in the reference position. When the speed V changes from the reference speed Vo to between V1 and V2, the angle $\theta$ changes from the reference angle $\theta_o$ to between $\theta_1$ and $\theta_2$. If the characteristic l is changed to m or n by applying a bias voltage $e_b$, to the deviation signal e, the arm 88 can be held at the reference angle $\theta_o$ even at the speeds V1 and V2.

But it is troublesome to adjust the bias voltage $e_b$, to a level suited to the conveyor speed V. It is practically difficult especially when the follow-up time is short and at a distant place where the transfer apparatus is not visible. Even when the adjustment is easy, if a bias voltage exceeding the dead zone of the flow-rate regulating valve 80 (FIG. 9) is applied, said regulating valve 80 opens and the follow-up carriage A, which should then stand still in the waiting position, advances.

Figure 13:
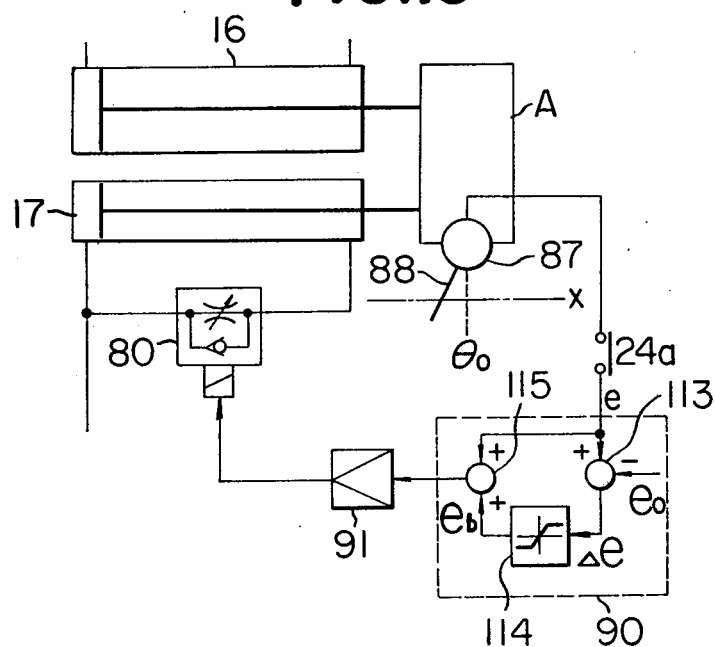
FIG. 13 is a hydraulic control circuit showing an embodiment of a synchronizing corrector-regulator.
Figure 14:
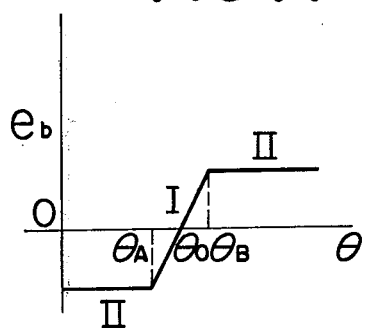
FIG. 14 shows the characteristic of the saturation amplifier in FIG. 13.

The synchronizing corrector-regulator 90 in FIG. 9 is provided to eliminate this shortcoming. An embodiment thereof is shown in FIG. 13, wherein a conventional comparator 113 delivers a signal $\Delta e = e - e_0$; equal to a difference between the deviation signal e and the one $e_o$ generated when the arm 88 is in the optimum transfer position. The signal $e_o$ can be established at will. The signal $\Delta e$ is inputted in a saturation amplifier 114, and amplified to a signal $e_b$ having a linear operating region I and a saturation region II as shown in FIG. 14. Angles of rotation $\theta_A$ and $\theta_B$ at both ends of the operating region I are picked up as angles between which the arm can transfer the article.

Figure 15:
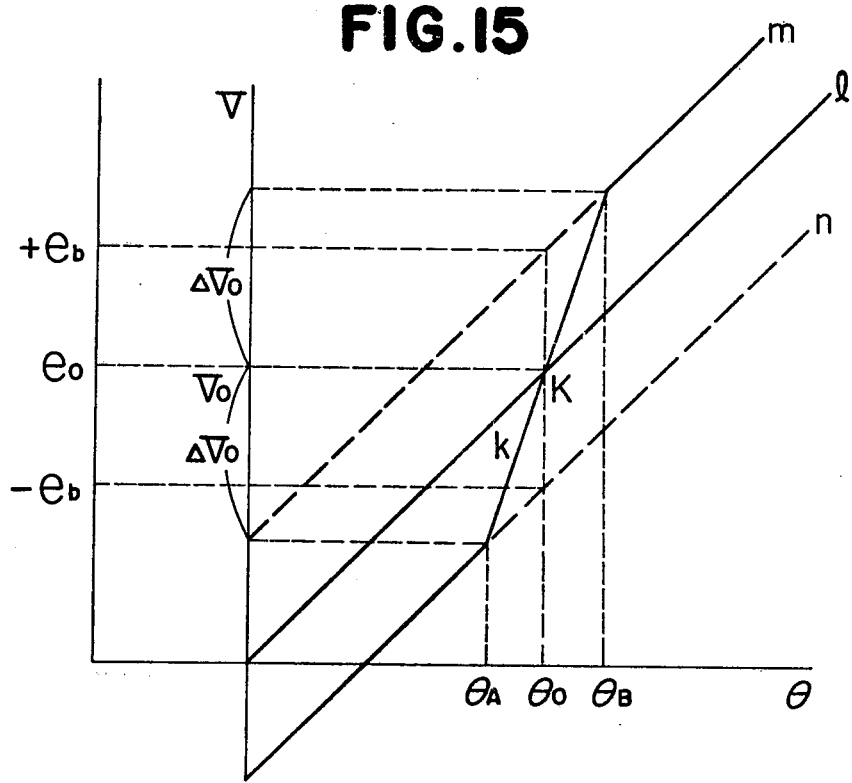
FIG. 15 shows the follow-up characteristic of the hydraulic control circuit of FIG. 13.

The signal $e_b$ is added, as a bias signal, to the deviation signal e by an adder 115, and inputted to the amplifier 91. Then the output of the amplifier 91 changes in accordance with a polygonal characteristic k indicated by a solid line in FIG. 15. Because the output of the amplifier 91 is proportional to the speed of the follow-up carriage A, the axis of ordinates in FIG. 15 represents the follow-up speed V of the follow-up carriage A. In this figure, the follow-up carriage A is so adjusted as to pursue the hanger 7 at an angle $\theta_o$ and a speed Vo (point K). Then, if the follow-up speed Vo changes, following the changes in the hanger speed, within the range of $\pm\Delta$Vo shown, the arm 88 lies between the angles $\theta_A$ and $\theta_B$. So, if these angles are established within such critical limits that the speed of the follow-up carriage A should not cause hunting or become unstable, the follow-up carriage A will be able to follow the hanger 7, travelling with varying speeds, while automatically maintaining a transferable relative positional difference, within said speed change range $\pm\Delta$Vo.

With the characteristic k, the input from the amplifier 91 is negative when the follow-up carriage A stands still in said waiting position. Therefore, the flow-rate regulating valve 80 does not open, and the follow-up carriage does not advance.

FIG. 16 shows a synchronizing corrector-regulator 90A that can control the follow-up speed at a place distance from the transfer apparatus, observing the follow-up condition on an indicator. As with the embodiment of FIG. 13, the difference signal $\Delta e = e - e_o$ is taken out and amplified in an amplifier 116, having an amplification factor of K, and the amplified signal $K\Delta e$ is indicated on a balance meter 117. The indicator of the balance meter 117 indicates a position to which the arm has turned, and the reference position $\theta_o$ when it stands still. Therefore, the relative positional difference between the hanger 7 and the follow-up carriage A can be observed at a remote location. Accordingly, when the speed of the follow-up carriage A is so adjusted that the indicator returns to the zero-position on adding a bias voltage $e_b$, adjusted by an adjuster 118, to the deviation signal e, the follow-up carriage A follows the hanger 7, maintaining the same relative position as at the reference position $\theta_o$.

When the amplification factor K is so adjusted, the output voltage of the amplifier 116 is made positive through an absolute-value circuit 119 as shown in FIG. 17 (a), and the difference between said positive output voltage and the voltage $e_c$ of a follow-up tolerance range setter 120 is taken out from a comparison circuit 121, a voltage whose potential reverses on both sides of $\theta_A$ and $\theta_B$ is obtained as shown in FIG. 17 (b). The voltage $e_c$ is so established that the article is transferred in the angular range between $\theta_A$ and $\theta_B$, and said reversing potential is converted by a relay 122 into an on-off signal S (as shown in FIG. 17 (b)). The signal S has a tolerance range $\pm X$ that corresponds to said transferable range. Therefore, the tolerance range can be indicated on the follow-up tolerance range setter 120, using the calibrated scale dial thereof. Or, a follow-up indication lamp 123, which is lighted by the signal S, may be provided in the vicinity of the zero point of the balance meter 117, so that the tolerance range can be read from the position of the indicator when the lamp lights.

This embodiment permits correcting the operation of the follow-up carriage A to the proper follow-up condition even when the speed of the hanger 7 changes. The transferable range can then be adjusted with ease. As said correction is made while watching the balance meter 117, there is no probability of adding such bias signal $e_{bl}$ that exceeds the dead zone of the flow rate regulating valve 800. Consequently, the follow-up carriage A can be stopped in the waiting position.

In the embodiment shown in FIGS. 1 and 2, the transverse carriage B cannot traverse to a very great distance, the traversing distance being restricted to the maximum reciprocating distance of the air cylinder 28. But, as will be eivdent from said operation thereof, the transverse carriage B may also be driven by an electric motor. Then the traversing limit is eliminated, and the transfer table 95 can select its position in a wider range with respect to Y axis.

FIGS. 18 through 21 show transfer apparatus of this invention having a transverse carriage Ba driven by an electric motor, wherein parts corresponding to those in FIGS. 1–3 are designated by similar reference numerals with a suffix "a" added thereto.

With this embodiment, a Braun tube 93a carried by the transfer apparatus (not shown) to a given position Pa is transferred onto a receiving table 125 on a cart 124 that moves in the direction of the X axis perpendicular to the figure.

A fixing frame 8a is fixed to a floor by braces 9a, and rails 10a are individually fixed to the top and bottom surfaces of two members 126, extending in the direction of the X axis, fastened to the fixing frame 8a. Support plates 127 are fixed to a frame 11a of a follow-up carriage Aa. Running rollers 12a supported by the support plate 127 and float-preventing rollers 13a supported by a bracket 128 projecting downward from the support plate 127 contact the top and bottom surfaces of the pair of rails 10a, with one disposed on top of the other. Also, rollers having a vertical shaft (not shown) contact the internal surface of the rails 10a, and guide and support the follow-up carriage Aa so as to be movable in the direction of the X axis. As with the embodiment of FIG. 1, the follow-up carriage Aa is moved in the direction of the X axis by an air cylinder 16a and a hydraulic cylinder 17a fixed to the frame 8a. A follow-up detector 87a is fitted to the lower end of a support frame 129 attached to the bottom of the frame 11a, so that an arm 88a thereof comes into engagement with a stop member 130 projecting sideward from the cart 124 to be turned thereby on a vertical axis.

A pair of support members 131, extending in the direction of the Y axis, are fixed to the support plate 127, and a pair of rails 132 are fixed to the top and bottom of said members 131. Four pairs each of top and bottom rollers 133 supported by a frame 26a of a transverse carriage Ba contact the top and bottom surfaces of the rails 132, and rollers having a vertical shaft (not shown) supported by the frame 26a contact the internal surface of the rails 132, whereby the transverse carriage Ba is movably guided and supported on the follow-up carriage Aa.

Two chains 136 are put over one pair each of sprocket wheels 134 and 135 provided on the support members 131, with both ends thereof fastened to the frame 26a to make the chains 136 endless. The chains 136 are then tightened by a tightening device 137. The paired sprocket wheels 134 have a common shaft 138. The common shaft 138 is fixed with a sprocket wheel 139 that is connected by a chain 142 with a sprocket wheel 141 of a traversing reversible motor 140 fixed to one end of the support members 131, so that the transverse carriage Ba is moved by the motor 140 between directly above the position Pa (FIG. 19) and directly above the cart 124.

A rectangular frame 144 is fixed to the frame 11a with braces 143, and a cable support rail 145, extending in the direction of the Y axis, is fixed to said rectangular frame. The rail 145 is hollow, having a narrow, longitudinal opening at the bottom (see FIG. 21). Two cable trolleys 147, each having rollers 146 and suspending a semi-circular support plate 148, run through said hollow rail 145. A control cable 149, comprising a vibration-resistant electric cable, hydraulic hose, compressed-air hose, etc. bound together, is droopingly passed thereover. The ends of the control cable 149 are droopingly connected to a connection box 150 fixed to the rectangular frame 144 and to a connection box 152 fixed to the transverse carriage Ba by a brace 151. They are further connected to a flexible external cable 153 via the connection box 150, and to equipment in the transverse carriage Ba via the connection box 152. The drooping portions of the control cable 149 bend and stretch as the transverse carriage Ba moves. To prevent possible breakage of the control cable 149 resulting from such bending and stretching, curved support members 154 are attached to the connection boxes 150 and 152 to support the control cable 149.

A pair of vertical guide bushes 155 (FIG. 19) and an air cylinder 34a are fitted to the transverse carriage Ba. The top ends of hollow guide rods 33a, slidably fitted in said bushes 155, are connected by a connection member 156, and an elevating frame Ca is fixed to the lower end thereof. Then, as shown in FIG. 20, a rod 157 of the air cylinder 34a and a rod 159 of an air cylinder 158, which is fitted to the elevating frame Ca in alignment with the air cylinder 34a, are joined together by a metal coupler 160.

The air cylinder 34a, through a change-over valve 84a, moves the elevating frame Ca, up and down with a long stroke, in the direction of the Z axis. The air cylinder 158 imparts, with a more limited stroke, a delicate up-down motion to the elevating frame Ca.

A rotary air actuator 162 is attached to a support member 161 (FIG. 21) projected by a bracket from the elevating frame Ca. A support plate 163 fitted to a vertical rotating shaft of actuator 162 supports a support plate 165, with a coil spring 164 therebetween. The support plate 165 is fitted with a vacuum cup 166 that constitutes a handling segment Da.

Different from the one in FIG. 5 that sucks by the action of a vacuum source, the vacuum cup 166 sucks the front side of a Braun tube 93a, being of venturi type that produces a vacuum by shooting forth compressed air.

Electricity and compressed air are supplied to the elevating frame Ca through the control cable connected to the connection box 167 and an air hose 167 that is hung with a suitable sag over a support table 168 projecting from the connection member 156, which are inserted in the hollow space between the guide rods 33a.

The sequence of operations of the vacuum cup 166, from the sucking of the Braun tube 93a to the transfer thereof from the position Pa onto the receiving table 125 on the cart 124, will not be described because it is similar to the previously described take-off operation of the embodiment shown in FIG. 1, except that the transverse carriage Ba is traversed by the electric motor 140, the air cylinder 158, in place of the air cylinder 40, lowers the vacuum cup 166 for sucking, and the rotary actuator 162 turns the Braun tube 93a. In this embodiment, of course, a switching contactor (now shown) supplants the change-over valve 83 (in FIG. 7) to switch the electric motor 140.

Figure 22A:
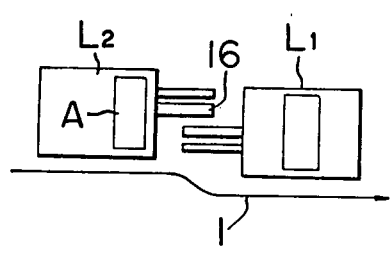
FIGS. 22 (a) and (b) show special layouts of the transfer apparatus of this invention.
Figure 22B:
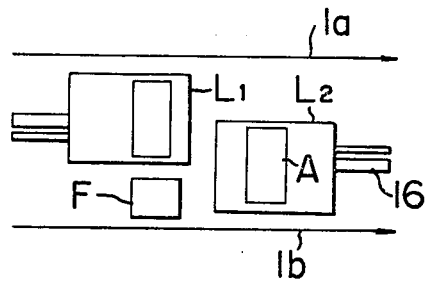

In all embodiments described above, the follow-up motion of the follow-up carriage A takes place when the air cylinder 16 projects. But a need sometimes arises that articles be transferred onto or off of conveyor 1 using two transfer apparatuses L1 and L2 as shown in FIG. 22 (a), or that two transfer apparatuses L1 and L2 be disposed opposite to each other to permit their closest possible arrangement, as in taking off articles from a conveyor 1a by the transfer apparatus L1 onto a table F and, then, transferring them onto a conveyor 1b by the transfer apparatus L2, as shown in FIG. 22 (b). In such cases, the follow-up carriage A of the transfer apparatus L2 should follow the conveyor 1 or 1b when the air cylinder 16 withdraws.

Figure 23:
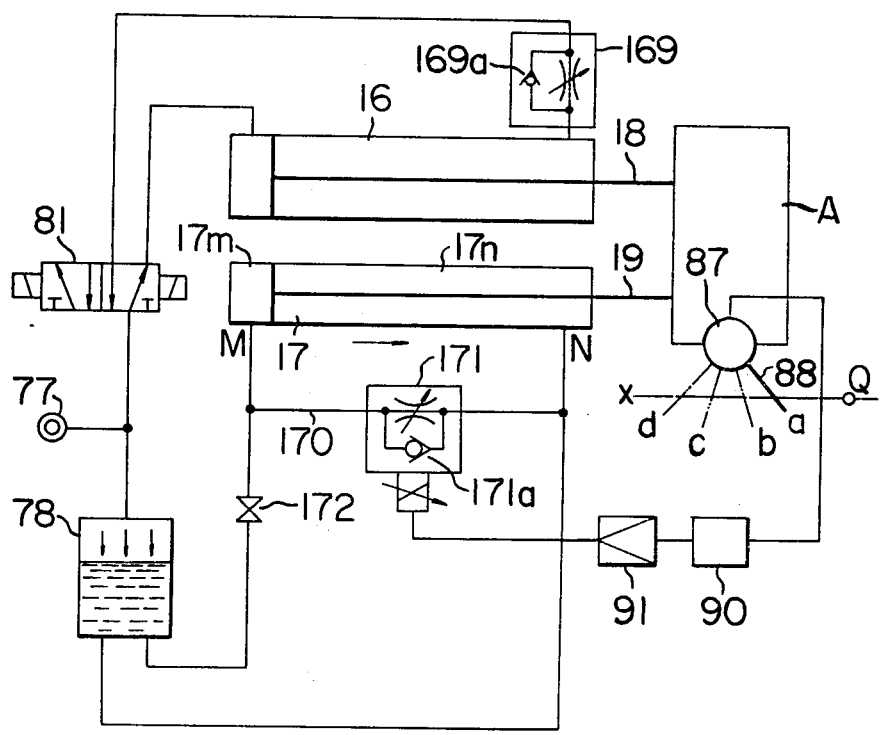
FIG. 23 is a follow-up control circuit similar to FIG. 9, but wherein the follow-up direction is reversed.

FIG. 23 exemplifies a follow-up control circuit suited for such cases, wherein parts similar to those in FIG. 9 are designated by similar reference numerals. In this embodiment, a throttle valve 169, having a check valve 169a to permit the inflow of air into the rod-side port of the air cylinder 16, is provided in said port, and the projecting speed of the rod 18 is controlled by said throttle valve 169. A pressure-compensating solenoid flow-rate regulating valve 171 having a check valve 171a is provided in a pipe line 170 connecting the ports M and N of the hydraulic cylinder 17, and the check valve 171a is so disposed as to permit the flow of pressurized oil from the port N to M. Also, the quantity of oil passing through the flow-rate regulating valve 171 is increased with increasing solenoid current. The port M connects through a valve 172, and the port N directly, with the bottom of the oil tank 78.

When the change-over valve 81 in the above-described follow-up control circuit is switched to the position illustrated, air flows from the compressed air supply device 77 to the head-side chamber of the air cylinder 16 to push the follow-up carriage A in the direction of the arrow. With the valve 172 closed, pressurized oil discharged from the port N, together with that made up for by the oil tank 78, flows through the check valve 171a into the port M, whereby the follow-up carriage A is caused to move at a speed controlled in accordance with the opening of the flow-rate regulating valve 169.

On switching the change-over valve 81 to a position opposite to that illustrated, air flows through the check valve 169a into the rod side chamber of the air cylinder 16 to cause the follow-up carriage A to move in a direction opposite to the arrow. At this time, as described previously with regard to the embodiment of FIG. 9, a signal proportional to the angle of rotation $\theta$ of the arm 88 is inputted through the synchronizing corrector-regulator 90 and the amplifier 91 into the flow-rate regulating valve 171 to control the opening thereof. Consequently, the quantity of oil flowing from the port M to N is controlled, whereby the follow-up carriage A is caused to pursue the hanger 7.

In this embodiment, pressurized oil from the chamber 17n and the oil tank 78 is rapidly sent through the check valve 171a into the chamber 17m by the pressure of compressed air working on said oil tank 78. Therefore, no cavity is formed inside the chamber 17m and the piping between the port M and the check valve 171a.

When the piston of the hydraulic cylinder 17 reaches the extreme end in the direction of the arrow, pressurized oil is no longer discharged from the port N and the chamber 17m is filled with pressurized oil. At this time, the follow-up carriage A is in the waiting position, pressurized oil in the chamber 17m does not flow backward to the oil tank 78, barred by the valve 172 and the check valve 171a, if the flow-rate regulating valve 171 is not energized. But if the pressurized oil contains air or a cavity therein, such air or cavity becomes compressed if the flow-rate regulating valve 171 remains unenergized when the air cylinder 16 is moved opposite to the arrow, thereby causing a deviation of the follow-up carriage A that hampers smooth execution of the subsequent operations. The air contained in the hydraulic circuit can be eliminated by opening the valve 172 to return pressurized oil to the oil tank 78.

Next, the operating cycle of the transfer apparatus of this embodiment that is used for transferring articles between two conveying devices traveling in different cycles will be described.

Figure 24:
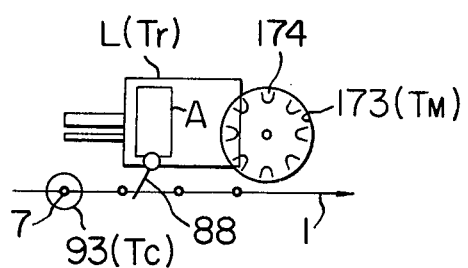
FIG. 24 shows a layout of the transfer apparatus of this invention that transfers articles from a trolley conveyor to an intermittently rotating device.

For example, as shown in FIG. 24, a trolley conveyor 1 brings in a Braun tube 93 in a constant cycle Tc, which is then transferred by transfer apparatus L onto a receiving frame 174 of a washing mill 173 intermittently traveling in a constant cycle Tm.

Figure 25:
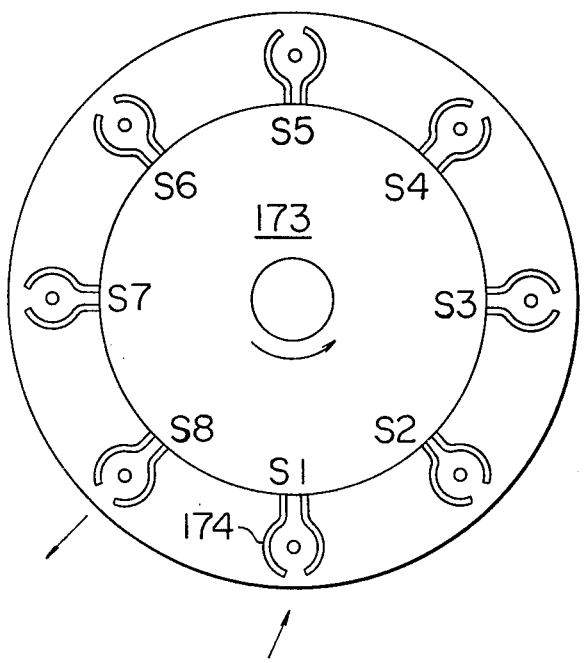
FIG. 25 is a plan view of the intermittently rotating device.

Each of eight receiving frames 174 (FIG. 25), arranged at equal angular intervals, intermittently turns from position S1 to S8, one after another. The Braun tube is received in position S1, injected with fluoric acid between positions S1 and S3, washed with water between positions S4 and S6, dried with hot air between positions S7 and S8, and transferred in position S8 to a conveying device having a conveying cycle different from Tc and Tm by another transfer apparatus. Assuming that the conveyor 1 conveys such number of Braun tubes as are enough to fill all receiving frames 174, the operating cycle Tr of the transfer apparatus L should have the following relation with said cycles Tc and Tm.

$$Tm \geq Tc \geq Tr \tag{1}$$

Equal marks indicate that all devices are synchronized, whereas inequal marks indicate that the quantity of Braun tubes carried by the conveyor 1 exceeds the handling capacity of the washing mill 173, so that the conveyor 1 passes the transfer apparatus L not releasing some Braun tubes.

First, the transfer operation of the apparatus L is analyzed timewise as follows:

(1) W1=time from the returning of the follow-up carriage A to the waiting position to the engagement thereof with the hanger 7 (time to wait for the hanger).

(2) Tp=time from the engagement of the hanger 7 with the arm 88 to the start of the elevation of the vacuum cup 47 that has sucked the Braun tube 93 (time to pursue and take out).

(3) Tb=time, following Tp, up to the stopping of the retreating transverse carriage B above the receiving frame 174 of the washing mill 173 (time to travel to the washing mill).

(4) W2=time, following Tb, to wait in the upper position until the washing mill 173 stops (time to wait for stopping).

(5) Tu=time to transfer onto the washing mill.

(6) Tf=time for the transverse carriage B to return to the advancing end, during which the follow-up carriage A returns to the waiting position.

Tr is the net transferring cycle without the waiting time W1 and W2, and expressed as $$Tr = Tp + Tb + Tu + Tf$$

Given that the stopping time is Ts and the traveling time is Tv, the intermittent traveling time Tm of the washing mill 173 is expressed as follows:

$$Tm = Ts + Tv$$

(I) Constant Transfer Condition

Figure 26:
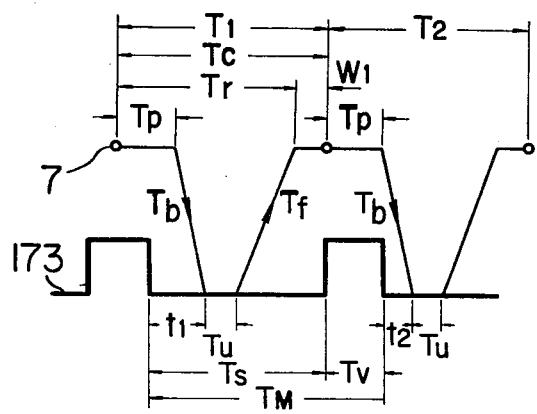
FIGS. 26 through 30 illustrate the transfer operation of the system shown in FIG. 24.

FIG. 26 shows the relationships between said times when the transfer is made from the hangers 7, coming in successively, onto the washing mill 173 without delay (W2=0). As evident from the figure, $$Tc = Tp + Tb + Tu + Tf + W1 = Tr + W1$$

$$\therefore W1 = Tc - Tr \tag{2}$$

Assuming that the time between the stop of the washing mill to the start of transfer in two successive cycles T1 and T2 are t1 and t2, respectively, $$t2 = t1 + Tu + Tf + W1 + Tp + Tb - Tm$$

$$= t1 + Tr + W1 - Tm$$

$$= t1 + Tc - Tm$$

$$\therefore t1 - t2 = Tm - Tc \tag{3}$$

That is, the time in which the transfer apparatus reaches the washing mill 173 shortens by Tm−Tc for every transfer cycle.

(II) Relation between Conveyor-Side Transfer Apparatus and Hanger

Figure 27:
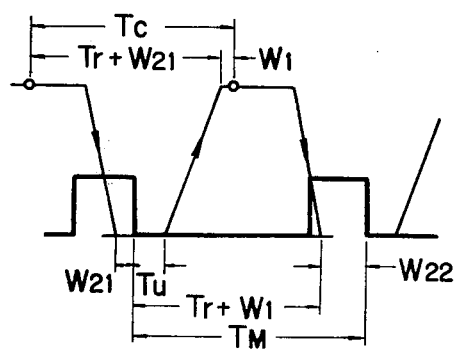

If the transfer apparatus L continues to reach the washing mill 173 in increasingly shortened time as described above, the apparatus L eventually reaches before, and therefore must postpone transfer until, the washing mill 173 stops (FIG. 27). Assuming that the waiting time before and after two successive transfer cycles are W21 and W22, $$W1 + Tr + W21 = Tc$$

$$W1 + Tr + W22 = Tm$$

$$\therefore W22 - W21 = Tm - Tc \tag{4}$$

That is, the waiting time W2 on the washing mill side gradually increases as with equation (3), while the waiting time W1 on the conveyor side decreases by that increment. When the waiting time W2n on the washing mill side becomes as follows in the n-th cycle, $$Tp + Tb + W2n + Tu + Tf = Tc$$

Namely, $$W2n = Tc - Tr \tag{5}$$

The hanger waiting time W1 becomes negative, or the hanger passes by when the transfer apparatus L arrives at the conveyor side, without delivering the Braun tube.

(III) Relationship after Hanger Passage

Figure 28:
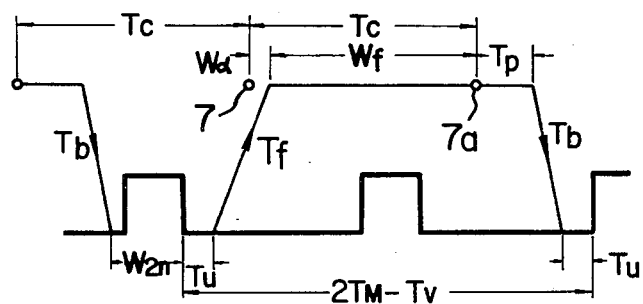

To prevent the receiving frame 174 of the washing mill from running away empty even when the hanger has passed by as described above, the transfer apparatus should receive a Braun tube from the next hanger while the washing mill 173 stands still in the next cycle, and reach the washing mill ahead of the starting time thereof, at least by Tu. This time relationship is shown in FIG. 28.

In this figure, Wα designates the time difference between the passing-by of the hanger 7 and the return of the transfer apparatus L to the conveyor side, which is expressed as $$W\alpha = W2n + Tr - Tc \tag{6}$$

Therefore, the time Wt for the transfer apparatus to wait for the next hanger is $$Wt = Tc - W\alpha = 2Tc - Tr - W2n \tag{7}$$

Figure 29:
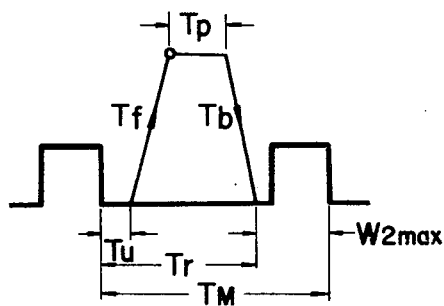

Meanwhile, Wα becomes maximum when there was no waiting time (W1=W2=0) in the preceding cycle, then the waiting time W2n in the current cycle attains the maximum value W2max (FIG. 29). Namely, $$W2\max = Tm - Tr$$

From equation (6), the maximum value Wαmax of Wα is expressed as $$W\alpha\max = W2\max + Tr - Tc$$

$$= Tm - Tc \tag{8}$$

From FIG. 28 and equation (7), $$Tc > Wt \geq Tc - W\alpha\max \tag{9}$$

$$\therefore Tc > Wt \geq 2Tc - Tm \tag{10}$$

From FIG. 28, $$Tu + Tf + Wt + Tp + Tb \geq 2Tm + Tu - Tv$$

Namely, $$Wt + Tr \geq 2Tm - Tu - Tv \tag{11}$$

By modifying equation (9), $$0 > Wt - Tc \geq Tc - Tm$$

$$\therefore Wt - Tc = r(Tm - Tc)$$

wherein $0 < r \leq 1$
Accordingly, $$Wt + Tr = Tc + Tr - r(Tm - Tc) \quad (12)$$

By substituting this in equation (11), $$Tc + Tr - r(Tm - Tc) \leq 2Tm - Tu - Tv$$

$$\therefore Tr \leq 2Tm - Tu - Tv - Tc + r(Tm - Tc) \quad (13)$$

As $r(Tm - Tc) > 0$, equation (13) holds good if $$Tr < 2Tm - Tu - Tv - Tc \quad (14)$$

That is, equation (14) represents a requisite to the net operating cycle of the transfer apparatus to perform full transfer onto the washing mill 173.

(IV) Leftover on Conveyor Side

Figure 30:
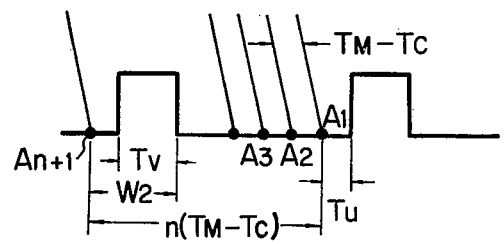

When the hanger 7 fails to deliver its load as described above, and transfer to the next hanger 7a is accomplished under the worst condition according to equation (14), the transfer apparatus reaches the washing mill at time point A1 (FIG. 30). Then, the arriving time in each subsequent cycle moves to points A2, A3 and so on, gaining by increments of $Tm - Tc$. When the waiting time W2 at point An+1 in the (n+1)th cycle corresponds to equation (5), the leftover occurs again, under the following condition:

$$W2 = Tu + n(Tm - Tc) - Tm + Tv$$

By substituting this in equation (5), $$Tu + n(Tm - Tc) - Tm + Tv > Tc - Tr$$

$$\therefore n > (Tc - Tr + Tm - Tu - Tv)/(Tm - Tc) \quad (15)$$

That is, continuous transfer can be performed at least to the (n+1)th hanger.

(EXAMPLE)

Assuming that $Tm = 8$ seconds, $Tv = 2$ seconds, and $Tu = 1$ second, the condition to perform full transfer to the washing mill is determined from equation (14) as follows:

$$Tr \leq 2 \times 8 - 1 - 2 - Tc = 13 - Tc$$

If Tc is established as $Tc = 7$ seconds so as to fit equation (1), $Tr = 6$ seconds and from equation (15), $$n > (7 - 6 + 8 - 1 - 2)/(8 - 7) = 6$$

Figure 31:
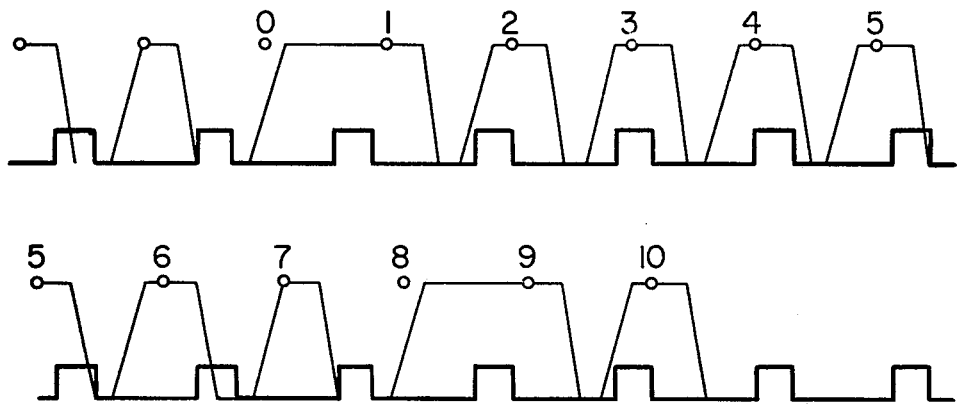
FIG. 31 illustrates a transfer operation in which left-over on a hanger occurs.

Accordingly, continuous transfer can be made up to the seventh hanger, and the eighth hanger passes by without delivering its load, as shown in FIG. 31.

As described above, two conveying devices, such as said conveyor and washing mill, can be operated in different cycles by operating the transfer apparatus in such cycle Tr that satisfies equations (1) and (14). This simplifies interlocked control of the two conveying devices, permits full transfer onto the receiving device, and causes the entire system to operate at maximum efficiency. The simplified control device brings about a remarkable effect especially when automatic transfer is effected between a plurality of conveying devices and one intermittently driven apparatus.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Conveyor load transfer apparatus, comprising:
   a follow-up carriage guided and supported to be movable in a direction in which a conveyor moves and driven by a double-acting air cylinder;
   a transverse carriage guided and supported on the follow-up carriage to be movable perpendicular to the running direction of the conveyor and driven back and forth by a transverse motor mounted on the follow-up carriage;
   an article-handling segment elevatably guided and supported on the transverse carriage and driven up and down by an elevation drive source mounted on the transverse carriage;
   a follow-up detector mounted on the follow-up carriage to generate deviation signals representing relative positions of the follow-up carriage and an article-supporting device of the conveyor;
   a double-acting hydraulic cylinder expanding and contracting according to the motion of the follow-up carriage, and a pressure-compensating flow-rate regulating valve with a check valve connected between the two ports of said hydraulic cylinder;
   said elevation drive source comprising two individually controlled double-acting air cylinders, one of said air cylinders having a buffering device including a check valve connected between the two ports thereof and a throttle valve, with a check valve, connected to the rod-side port thereof; p1 wherein the opening of said pressure-compensating flow-rate regulating valve is controlled by said signals so that said follow-up carriage follows the moving article supporting device and transfers an article onto or off said article-supporting device with said article-handling segment while moving.

2. Conveyor load transfer apparatus, comprising:
   a follow-up carriage guided and supported to be movable in a direction in which a conveyor moves and driven by a double-acting air cylinder;
   a transverse carriage guided and supported on the follow-up carriage to be movable perpendicular to the running direction of the conveyor and driven back and forth by a transverse drive source mounted on the follow-up carriage;
   an article-handling segment elevatably guided and supported on the transverse carriage and driven up and down by an elevation drive source mounted on the transverse carriage;
   a follow-up detector mounted on the follow-up carriage to generate signals representing relative positions of the follow-up carriage and an article-supporting device of the conveyor;
   a double-acting hydraulic cylinder expanding and contracting according to the motion of the follow-up carriage, and a pressure-compensating solenoid flow-rate regulating valve connected, ir parallel with a check valve, between the two ports of said hydraulic cylinder; and a synchronizing corrector-regulator applying bias voltage to compensate for speed variations of the conveyor to said signals;

wherein the opening of said pressure-compensating solenoid flow-rate regulating valve is controlled by output signals of said synchronizing corrector-regulator so that said follow-up carriage follows the moving article-supporting device, maintaining a relative positional difference within a given range, and transfers an article onto or off said article-supporting device with said article-handling segment while moving.

* * * * *

UNITED STATES PATENT AND TRADEMARK OFFICE
CERTIFICATE OF CORRECTION

PATENT NO. : 4 183 427

DATED : January 15, 1980

INVENTOR(S) : Hisao Tomikawa

It is certified that error appears in the above-identified patent and that said Letters Patent are hereby corrected as shown below:

Column 18, line 39; delete "pl".

Column 18, line 66; change "ir" to ---in---.

Signed and Sealed this

Tenth Day of June 1980

[SEAL]

Attest:

SIDNEY A. DIAMOND

*Attesting Officer*  *Commissioner of Patents and Trademarks*